United States Patent Office 3,495,937
Patented Feb. 17, 1970

3,495,937
AMMONIUM POLYPHOSPHATE PROCESS
Chung Yu Shen, 9528 Laguna Drive, St. Louis, Mo. 63132, and Norman E. Stahlheber, 502 Dianne St., Columbia, Ill. 62236
No Drawing. Filed Mar. 16, 1965, Ser. No. 440,279
Int. Cl. C01b 25/28
U.S. Cl. 23—106                    11 Claims

ABSTRACT OF THE DISCLOSURE

A process for preparing an ammonium polyphosphate having the formula:

$$H_{(n-m)+2}(NH_4)_m P_n O_{3n+1}$$

wherein $n$ is an integer having an average value greater than 10 and $m/n$ is from about 0.7 to 1.1 and the maximum value of $m$ is $n+2$ and having a pre-selected water solubility which comprises heat treating an ammonium polyphosphate at temperatures from about 100° C. to about 350° C. and under an atmosphere controlled in ammonia vapor pressure content and water vapor content for a sufficient time to result in said ammonium polyphosphate having said pre-selected water solubility.

---

This invention pertains to a process for preparing ammonium polyphosphates. More particularly, this invention pertains to a process for controlling the water solubility of ammonium polyphosphates as well as to an improved process for preparing, as desired, either substantially water-insoluble or relatively water-soluble ammonium polyphosphates.

In preparing ammonium polyphosphates by the thermal condensation of a suitable phosphate containing material, such as monoammonium orthophosphate, with an ammoniating and condensing agent, such as urea, the polyphosphate product formed contain a substantially water-insoluble fraction and a relatively water-soluble fraction. Depending upon the particular desired use for the ammonium polyphosphate, it is oftentimes advantageous or necessary to use either a substantially water-insoluble or a relatively water soluble ammonium phosphate. As can be appreciated, therefore, a method for controlling the water solubility of ammonium polyphosphates would represent an advancement in this art.

It is, therefore, an object of the present invention to provide an improved process for preparing ammonium polyphosphates.

It is a further object of the present invention to provide a process for controlling the water solubility of ammonium polyphosphates.

It is a further object of the present invention to provide an improved process for preparing substantially water-insoluble ammonium polyphosphates.

It is a still further object of the present invention to provide an improved process for preparing relatively water-soluble ammonium polyphosphates.

These and other objects will become apparent from the following detailed description.

It has now been found that the water solubility of ammonium polyphosphates can be controlled and, as desired, either a substantially water-insoluble ammonium polyphosphate or a relatively water-soluble ammonium polyphosphate can be prepared by heat treating an ammonium polyphosphate in the presence of an atmosphere controlled in ammonia vapor and water vapor content as will be more fully discussed hereinafter.

For purposes of the present invention a substantially water-insoluble ammonium polyphosphate refers to a polyphosphate which contains a high weight percent of the substatially water-insoluble fraction and as defined herein is an ammonium polyphosphate having a solubility of 5 grams or less/100 cc. of water when 10 grams of said polyphosphate is slurried in 100 cc. of water for 10 minutes at 25° C. For purposes of the present invention a relatively water-soluble ammonium polyphosphate refers to a polyphosphate which contains a high weight percent of the relatively soluble fraction and as defined herein is an ammonium polyphosphate having a solubility greater than 5 grams/100 cc. of water when 10 grams of said polyphosphate is slurried in 100 cc. of water for 10 minutes at 25° C. Additionally, for purposes of the present invention an ammonium polyphosphate having a solubility of a specified value refers to the solubility value in grams per 100 cc. of water when 10 grams of said polyphosphate is slurried in 100 cc. of water for 10 minutes at 25° C.

Heat treating the ammonium polyphosphate can be carried out on an ammonium polyphosphate product or while the ammonium polyphosphate is being prepared, that is, during the thermal condensation of a composition comprised of a phosphate containing material, an ammoniating agent and a condensing agent as will be more fully discussed hereinafter.

Typical compositions comprised of a phosphate containing material, an ammoniating agent and a condensing agent useful in the present invention are those which, in general, can, by thermal condensation, polymerize into crystalline ammonium polyphosphates. The compositions may by mixtures, addition compounds or double salts, or reaction products and such can be in the liquid form, such as a melt, or a solid form, such as a crystalline form or an amorphous granular or powder form, that is, those forms exhibiting little or no crystalline structure as evidenced by an X-ray diffraction pattern.

In general, to prepare ammonium polyphosphates by the thermal condensation reaction of the present invention there should be at least enough of the ammoniating agent present to supply about 1 mol of ammonia per mol of phosphorus present. Also, the condensing agent should be present in amounts to insure essentially quantitative removal of all water present or formed in the system, except for any water of constitution remaining in the reaction product.

Typical phosphate containing materials include those containing or yielding by hydrolysis at least one phosphate radical ($PO_4\equiv$) and which are capable of being thermally condensed with the ammoniating agent and the condensing agent to form an ammonium polyphosphate. Such materials include monoammonium orthophosphate, diammonium orthophosphate, triammonium orthophosphate, orthophosphoric acid, condensed phosphoric acid, phosphorus pentoxide, phosphorus oxyhalides, such as phosphorus oxybromide and phosphorus oxychloride, and the like including mixtures of the foregoing.

Condensed phosphoric acid is a phosphoric acid containing any quantity of one or more polyphosphoric acids and/or metaphosphoric acids and any such acid can be employed in this invention. The polyphosphoric acids include pyrophosphoric acid and other polymers from the tri- to the nonapolymer and higher. The properties and compositions of the condensed phosphoric acids vary with the $P_2O_5$ content of the condensed phosphoric acids as discussed in Van Wazer, Phosphorus and its Compounds, Interscience Publishers, Inc., New York, N.Y., volume 1, (1958), and shown by Table 12–1, page 748. Although, in general, for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 88 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid.

Typical of the ammoniating agents which are suitable for use in the instant invention are those agents which are capable of supplying or releasing ammonia under the conditions of the thermal condensation reaction and which include such agents as ammonia gas, liquid ammonia, inorganic ammonium salts containing non-oxidizing anions, such as halides, $CO_3^{2-}$, $S^{2-}$, and the like, which include such compounds as ammonium carbonate, ammonium bicarbonate, ammonium chloride, ammonium fluoride, ammonium sulfide and the like, ammonium hydroxide, hydroxy amine chloride, hydroxy amine fluoride, monoammonium orthophosphate, diammonium orthophosphate, triammonium orthophosphate, ammonium pyrophosphate, urea phosphate and the like including mixtures of the foregoing.

Typical of the condensing agents which are suitable for use in the instant invention are those which are capable of keeping the reaction system sufficiently dry during the thermal condensation reaction by removing the water in one form or another from the system and which include such agents as phosphorus pentoxide, phosphorus oxyhalides, such as phosphorus oxychloride and phosphorus oxybromide, urea phosphate, phosphorus pentahalides, such as phosphorus pentabromide, and phosphorus pentachloride, and the like including mixtures of the foregoing.

In addition to the foregoing ammoniating and condensing agents, there can also be used a combined ammoniating and condensing agent, that is, a material which is capable of functioning either as an ammoniating agent or a condensing agent or as both an ammoniating and condensing agent. The combined ammoniating and condensing agent can be used either alone or with other ammoniating agents and/or condensing agents.

Typical of the combined ammoniating and condensing agents which are suitable for use in the instant invention are those nitrogeneous compounds which are capable of releasing ammoniacal nitrogen and condensing with the phosphorus-containing materials under the conditions of the thermal condensation reaction described herein. In particular are the nitrogeneous compounds containing one or more amide groups, i.e., a compound resulting from replacement of one or more atoms of hydrogen in ammonia by univalent acid radicals, and particularly the primary amides, and containing the elements carbon and/or sulfur, nitrogen, oxygen and hydrogen as well as containing no carbon-carbon bonds. Preferably the compounds are noncyclic structures and there are few, if any, compounds which contain 3 or more amide groups which can be used in practicing the present invention. Especially preferred are low molecular weight nitrogenous compounds, i.e., having a molecular weight below about 200, and containing at least one but no more than 2 of the following radicals: carbamyl, carbamic, sulfamino, sulfamyl and ureido. As being illustrative of such compounds are urea, ammonium carbamate, biuret, sulfamide, sulfamic acid, ammonium sulfamate, guanyl urea, methyl urea, formamide, amino urea, 1-3-di-amino urea, biurea and the like with urea, because of its relative inexpensiveness and ready availability, being particularly preferred.

As being illustrative of some of the foregoing types of reactants which can be used to prepare ammonium polyphosphates (APP) by thermal condensation the following equations are set forth:

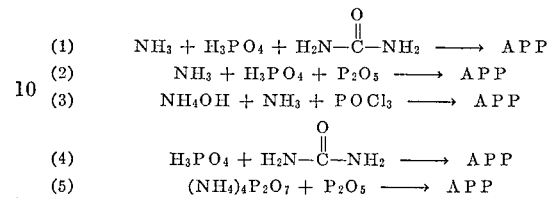

As can be appreciated from the foregoing, the individual reactants can function in some instances in a dual capacity, that is, as both a phosphate containing material and an ammoniating agent, as both a phosphate containing material and a condensing agent, or as a combined ammoniating and condensing agent. Preferred reactants for use in the present invention are the combined ammoniating and condensing agents as described hereinabove and the phosphate containing materials selected from the group consisting of the ammonium orthophosphates, that is, the mono-, di- and tri-ammonium orthophosphates, orthophosphoric acid, condensed phosphoric acid and mixtures thereof.

The composition disclosed and described hereinafter are intended to be further illustrative of the preferred compositions which can be used in the process of the present invention.

One composition which can be used in preparing ammonium polyphosphates is comprised of condensed phosphoric acid and a combined ammoniating and condensing agent. In general, it is usually only necessary to add the combined ammoniating and condensing agent to the condensed phosphoric acid, preferably admixing the reactants, and heating the admixture for the thermal condensation reaction to take place. Usually amounts of the combined ammoniating and condensing agent and condensed phosphoric acid between about 1 to about 5 on a nitrogen to phosphorus molar ratio basis of reactants are suitable with a molar ratio of between about 1 and about 3 being preferred.

Another composition which can be used in preparing ammonium polyphosphates is comprised of orthophosphoric acid and a combined ammoniating and condensing agent. Usually, any concentration of orthophosphoric acid can, in general, be used although it is preferred that concentrations above about 40% by weight be used and particularly preferred are concentrations of about 85% and higher. In general, it is usually only necessary to add the combined ammoniating and condensing agent to the orthophosphoric acid, preferably admixing the reactants, and heating the admixture for the thermal condensation reaction to take place. As was applicable when using the condensed phosphoric acid as a reactant as hereinabove described, amounts of reactants between about 1 to about 5 on a nitrogen to phosphorus molar ratio basis are suitable with a molar ratio of between about 1 and about 3 being preferred.

A further composition which can be used in preparing ammonium polyphosphates is comprised of a product of a phosphate containing material, such as phosphoric acid, and a combined ammoniating and condensing agent, such as urea, that is, urea-phosphate, which is believed to be an addition compound or salt, with a combined ammoniating and condensing agent, such as urea. In general, it is usually only necessary to admix the urea-phosphate and urea and heat such mixture for the thermal condensation reaction to take place. Usually amounts of the combined ammoniating and condensing agent and the addition compound between about 0.5 to about 2 on a nitrogen (from the combined ammoniating and condensing agent) to phosphorus (from the addition compound) molar ratio basis of reactants are suitable, with a molar ratio of from about 1 to about 2 being preferred.

A still further composition which can be used in preparing ammonium polyphosphates is comprised of ammonium phosphate salts, i.e., monoammonium orthophosphate, diammonium orthophosphate, triammonium phosphates, and mixtures thereof, and a combined ammoniating and condensing agent. In general, it is usually only necessary to admix the ammonium phosphates and the combined ammoniating and condensing agent and heat such a mixture for the thermal condensation reaction to take place. Usually amounts of the combined ammoniating and condensing agent and ammonium phosphates between about 1 to 7 on a nitrogen (from the combined ammoniating and condensing agent) to phosphorus (from the ammonium orthophosphate) molar ratio basis of reactants are suitable, with a molar ratio of between about 1 and about 3 being preferred.

The ammonium polyphosphates prepared by the process of the instant invention are polymeric polyphosphates, i.e., those compounds having a P-O-P type linkage, having the general formula:

$$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$. The average value of $n$ being greater than 10 is evidenced by the paper chromatography method [Karl-Kroupa, Anal. Chem., 28, 1091 (1956)], and the polymeric P-O-P type linkage is evidenced by n.m.r. spectra which indicates substantially no P-N-P type linkages and no ortho, pyro or short chain P-O-P type groups and by infrared spectra which indicates P-O-P type linkages but does not indicate substantially any P-N type linkages.

These polymeric compounds can be either straight chain structures or branched chain structures. It should be noted that substantially all of the nitrogen in these compounds is present as the ammoniacal nitrogen and there is substantially no nuclear nitrogen present in the compounds. Although theoretically the ammoniacal nitrogen to phosphorus molar ratio for the compounds of the instant invention is about 1, i.e.

$$\frac{m+2}{n}$$

with $m=n$, when the compounds are completely ammoniated, in some cases the molar ratio of ammoniacal nitrogen to phosphorus is less than 1 and it is intended that this invention pertains to those polymeric ammonium polyphosphates having a molar ratio of not less than about 0.7.

The term "ammoniacal nitrogen" refers to that nitrogen which is present in the form of ammonium ions and is capable of being removed by the hydrogen form of a strong cation exchange resin, i.e. the hydrogen form of a sulfonate polystyrene resin. The term "non-ammoniacal nitrogen" or "nuclear nitrogen" refers to nitrogen incapable of being removed in the manner of true ammonium nitrogen.

The ammonium polyphosphates can be prepared by the process of the instant invention exhibiting many different crystalline forms as evidenced by their X-ray diffraction patterns as well as the non-crystalline or amorphous form.

The compounds of the instant invention, i.e., ammonium polyphosphates, are useful for a number of different applications which include their usefulness as fire-retardants in many different applications, such as plastics, textiles and paint compositions. In addition, the compounds are useful as builders in synthetic detergent compositions, especially such compositions containing anionic surface-active agents, nonionic surface active agents and mixtures thereof. They are also useful as fertilizer materials.

As previously mentioned, an ammonium polyphosphate product is heat treated and/or a composition comprised of a phosphate containing material, an ammoniating agent and a condensing agent is thermally condensed under a controlled atmosphere of ammonia vapor and water vapor content in order to prepare ammonium polyphosphates having a desired degree of water solubility.

In general, the thermal condensation, that is, the polymerization of the composition into P-O-P linkage type polymers with concomitant loss of gases as a result of the polymerization, and/or the heat treatment can be carried out by heating the composition and/or the ammonium polyphosphate product, at temperatures from about 100° C. to about 350° C. and preferably from about 200° C. to about 300° C. Usually, the times necessary to produce the desired product are dependent on the temperatures used with higher temperatures requiring shorter periods of time for preparing the ammonium polyphosphates with the desired degree of water solubility.

It has been found that the atmosphere, i.e. ammonia vapor and water vapor content, in which the thermal condensation of the composition takes place is important in not only improving the process, such as by improving process conditions, such as conversion rates and yields, permitting better process control, and permitting more flexible control such as permitting a wider range of temperature to be used, but, and perhaps more importantly, also provides a method for controlling the water solubility of the ammonium polyphosphate product.

In general, the ammonia vapor content of the atmosphere in which the heat treatment and/or thermal condensation takes place in preparing a substantially water-insoluble ammonium polyphosphate product should be substantially rich in ammonia and depending upon, inter alia, such process conditions as temperature and time of conversion, the ammonia vapor should have a partial pressure equal to or greater than that calculated from the following equation:

(I) $\quad \log_{10} P_{NH_3} = 7.37 - (2860)/T$ where $P_{NH_3}$ is the partial pressure of ammonia vapor in mm. Hg above the material and T is the temperature in degrees Kelvin. Additionally, the atmosphere should be substantially free of water vapor and depending upon, inter alia, the ammonia vapor pressure, the water vapor pressure should be equal to or below that calculated from the following equation:

(II) $\quad [P_{NH_3}][P_{H_2O}] = 40$ where $P_{NH_3}$ and $P_{H_2O}$ are the vapor pressures in mm. Hg of ammonia and water, respectively, and $P_{NH_3}$ is determined by Equation I. Generally speaking, the greater the ammonia vapor pressure and the less the water vapor pressure the more water-insoluble the product will be. For example, in preparing an ammonium polyphosphate having a solubility less than 1.5, the ammonia vapor pressure should be equal to or greater than the value obtained from Equation I, while the water vapor pressure should be less than about 2 mm. Hg.

For preparing relatively water-soluble crystalline ammonium polyphosphates the ammonia vapor pressure should be below that calculated from Equation I hereinabove, and the water vapor pressure should be above that calculated from Equation II hereinabove. Again, generally speaking, the less the ammonia vapor pressure and the greater the water vapor pressure, the more water soluble the product will be.

As can be appreciated from the foregoing, the ammonia vapor pressure and water vapor pressure are important inter-related conditions in preparing ammonium polyphosphates of controlled water solubility.

Determination of the ammonia vapor pressure and water vapor pressure may be carried out by the method described in the articles Johnstone, Batchelor and Shen, A.I.Ch.E. Journal, page 319, September 1955 and Johnstone, Hounouras, Schowalter, Ind. Eng. Chem., 46, 702 (1954).

The desired ammonia vapor pressure in the atmosphere during the heat treatment and/or thermal condensation reaction can be achieved by various methods such as adding amounts of the ammoniating agent in excess of that necessary to form the ammonium polyphosphate and carrying out the reaction in a closed reaction vessel or by carrying out the heat treatment and/or thermal condensation under a stream of ammonia gas injected into the system in predetermined amounts. Also, in somewhat the same manner the desired water vapor pressure in the atmosphere during the heat treatment and/or thermal condensation can be achieved by various methods such as using a reactant containing water, such as 70% orthophosphoric acid, and adjusting the amount of condensing agent used to permit under the reaction conditions the desired amount of water vapor pressure or by carrying out the heat treatment and/or thermal condensation under a stream of steam injected into the system in predetermined amounts.

During the heat treatment and/or thermal condensation it is preferred that oxygen be excluded as much as possible due to the danger of an explosion in the presence of oxygen and the discoloring effect which oxygen has on the final product. It is, therefore, preferred that the heat treatment and/or thermal condensation be carried out in an inert atmosphere, that is, an atmosphere containing $CO_2$, $NH_3$, $H_2O$ and other non-oxidizing gases.

Various methods can be used to carry out the heat treatment of the ammonium polyphosphate product depending upon inter alia, equipment used, temperature, and the like. Illustrative of one method is the batch method for preparing relatively water soluble ammonium polyphosphates. A substantially water-insoluble ammonium polyphosphate having a water solubility of about 2.0 is charged to an oven and heated at about 250° C. in a controlled atmosphere in which the ammonia vapor pressure is about 50 mm. Hg and the water vapor pressure is about 710 mm. Hg for about 2 hours to convert the product into relatively water-soluble ammonium polyphosphates having a solubility of about 8.0. As can be appreciated, the foregoing is particularly advantageous when it is desired to change the water solubility of an already formed ammonium polyphosphate product and thus, for example, a lot containing substantially water-insoluble ammonium polyphosphate may be converted to many portions of various desired degrees of water solubility.

Various methods can be used to carry out the thermal condensation reaction depending upon, inter alia, type of composition used, conditions used and the like. Illustrative of one method is the batch method for preparing relatively water-soluble ammonium polyphosphates wherein monoammonium orthophosphate is used as the phosphate containing material and urea is used as the combined ammoniating and condensing agent. The monoammonium orthophosphate and urea are intimately blended together and charged to an oven and heated at about 300° C. in a controlled atmosphere in which the ammonia vapor pressure is about 50 mm. Hg and the water vapor pressure is about 50 mm Hg for period of time sufficient to convert the composition into relatively water-soluble ammonium polyphosphates. The ammonium polyphosphate is removed from the oven, air-cooled, and milled. Although the foregoing has been described with respect to monoammonium orthophosphate and urea, other compositions can be used in the batch method which include the aforedescribed compositions comprised of a combined ammoniating and condensing agent with ortho- or condensed phosphoric acids and the like.

As illustrative of another method is the continuous method for preparing substantially water-insoluble ammonium polyphosphates wherein orthophosphoric acid is used as the phosphate containing material and urea is used as the combined ammoniating and condensing agent. These materials are heated together to form a melt in proportions as hereinbefore described. The melt is then sprayed onto a hot recycle bed of ammonium polyphosphate granules of the desired crystalline form, on a weight ratio of additive to melt of about 30:1. The hot ammonium polyphosphate bed is used to supply some of the heat necessary for thermally condensing the melt and renders such as handleable solids. The bed is then passed through an indirect-fired calciner where the thermal condensation can be completed with the bed temperature at about 300° C. During the calcination a controlled atmosphere in which the ammonia vapor pressure is about 150 mm. Hg and the water vapor pressure is about 0.2 mm. Hg is maintained over the bed. The off-gases are either discarded or recovered for re-use. A portion of the product is then cooled and milled for its intended use, while the remaining portion is recycled. Although the foregoing has been described with respect to a composition comprised of orthophosphoric acid and urea, other compositions can be used in the continuous method which include the aforedescribed composition comprised of the combined ammoniating and condensing agent and condensed phosphoric acid as well as the aforedescribed composition comprised of the combined ammoniating and condensing agent and monoammonium orthophosphate and/or diammonium orthophosphate.

The following examples are presented to still further illustrate the invention, with parts and percentages by weight being used in the examples unless otherwise indicated.

EXAMPLE 1

About 20 parts of ammonium dihydrogen phosphate and 11 parts of urea were blended together and then split into two equal portions. Each portion was heated in an oven at 275° C. for one hour with ammonium polyphosphate (APP) being produced. The atmosphere maintained over the portions in mm. of Hg were as follows:

| | Vapor Phase Composition | | |
|---|---|---|---|
| | $NH_3$ | $H_2O$ | Inert gases $CO_2$, etc.) |
| Portion: | | | |
| 1 | 456 | 0 | 304 |
| 2 | 76 | 15.2 | 668.8 |

The portions of APP produced were analysed with the following results:

| | Solubility of APP | pH of a 10% slurry of APP |
|---|---|---|
| Portion: | | |
| 1 | 1.3 | 4.7 |
| 2 | 9.0 | 3.0 |

EXAMPLE II

About 20 parts of ammonium dihydrogen phosphate and 21.5 parts of anhydrous phosphorus pentoxide are blended together and placed in a pressure chamber which is then charged with gaseous ammonia, replacing the air in the chamber. The charge is heated to about 275° C. for about 1 hour while maintaining the ammonia pressure at about 1 atmosphere. The solubility characteristic of the resulting ammonium polyphosphate product is about 1.7.

EXAMPLE III

Twenty parts of an ammonium polyphosphate whose water solubility is 9.0 is placed in the same container with one part of urea without blending of the two materials. The container is purged with ammonia, then heated to about 275° C. for about four hours while maintaining the ammonia vapor pressure at about 1 atmosphere. The solubility characteristics of the resulting ammonium polyphosphate product is about 2.2.

EXAMPLE IV

Fifty parts of ammonium polyphosphate whose water solubility is 5.5 is blended intimately with 17 parts of urea and 33 parts of monoammonium orthophosphate. The mixture is heated to 275° C. for twenty hours under an atmosphere containing an ammonia vapor pressure of about 475 mm. Hg and an inert gas ($CO_2$, etc.) vapor pressure of about 274 mm. Hg. The solubility characteristic of the resulting ammonium polyphosphate product is about 0.3.

EXAMPLE V

A stream of condensed phosphoric acid (76% $P_2O_5$) is continuously blended with a stream of molten urea in a tank equipped with adequate cooling and agitation facilities. Proportions of urea to condensed phosphoric acid are controlled at 0.75 to 0.80 mol of urea per mol of condensed phosphoric acid. The resulting feed solution at a temperature of about 80–100° C. is wed to a moving bed of granular ammonium polyphosphate having a temperature of about 250° C. The atmosphere maintained over the reactants is not allowed to be contaminated by the heating gases or the room air, contains substantially no water vapor, and has an ammonia vapor pressure of about 300 mm. Hg which is provided by the gases which evolve from the reactant mass. The heat which is required to convert the feed material to ammonium polyphosphate is regenerated by passing the moving bed through an indirect-fired calciner. As soon as the temperature of the bed returns to 250° C. a portion of ammonium polyphosphate product is removed from the system and the remainder is retained as bed material to receive fresh feed material. The ammonium polyphosphate product removed from the system has a solubility characteristic of about 1.0.

EXAMPLE VI

Example V is repeated except that the proportion of urea to condensed phosphoric acid is controlled at 0.72 to 0.74 mol of urea per mol of condensed phosphoric acid. The atmosphere maintained over the reactants resulting from the foregoing proportions is found to have about the following composition:

|  | Vapor pressure, mm. Hg |
|---|---|
| $H_2O$ | 20 |
| $NH_3$ | 275 |
| $CO_2$ | 450 |

The ammonium polyphosphate product removed from the system has a solubility of about 5.

EXAMPLE VII

Several portions of about 10 parts each of an ammonium polyphosphate having a water solubility of about 1.4 were placed in suitable vessels and heated at temperatures as indicated and for periods of time as indicated under forced air circulation containing 8 to 10 mm. Hg water vapor pressure and substantially no ammonia vapor pressure. The following table presents the results of the increased water solubility as well as the percent weight loss of the resulting ammonium polyphosphate products.

TABLE 1

| Temperature, ° C.: | Time period, hours | Wt. loss, percent | Solubility |
|---|---|---|---|
| 200 | 1 | 0.37 | 1.83 |
| 200 | 2 | 0.44 | 2.88 |
| 200 | 4 | 0.45 | 4.45 |
| 225 | 1 | 0.09 | 5.06 |
| 225 | 2 | 0.23 | 6.31 |
| 225 | 3 | 0.41 | 6.31 |
| 225 | 6 | 0.36 | 7.28 |
| 250 | 1 | 0.74 | 3.71 |
| 250 | 2 | 1.03 | 5.15 |
| 250 | 4 | 1.45 | 6.67 |

What is claimed is:

1. A process for preparing ammonium polyphosphate having a solublity of 5 grams of less/100 cc. of water when 10 grams of said polyphosphate is slurried in 100 cc. of water at 25° C. for 10 minutes and having the general formula:

$$H_{(n-m)+2}(NH_4)_m P_n O_{3n+1}$$

wherein $n$ is an integer having an average value greater than 10 and $m/n$ is from about 0.7 to 1.1 and the maximum value of $m$ is equal to $n+2$ which comprises heat treating a relatively water-soluble ammonium polyphosphate having the above general formula at temperatures from about 100° C. to about 35° C. and under an atmosphere having an ammonia vapor pressure of at least $$\log_{10} P_{NH_3} = 7.37 - \frac{2860}{T}$$

where $P_{NH_3}$ is the partial pressure of ammonia and T is the temperature of said heat treatment in degrees Kelvin, and a water vapor pressure no greater than $$P_{H_2O} = 40/P_{NH_3}$$

where $P_{H_2O}$ is the partial pressure of water and $P_{NH_3}$ is the partial pressure of ammonia, for a sufficient time to convert said water-soluble ammonium polyphosphate to said water-insoluble ammonium polyphosphate.

2. A process for preparing ammonium polyphosphate having a solubility greater than 5 grams/100 cc. of water when 10 grams of said polyphosphate is slurried with 100 cc. of water at 25° C. for 10 minutes and having the general formula:

$$H_{(n-m)+2}(NH_4)_m P_n O_{3n+1}$$

wherein $n$ is an integer having an average value greater than 10 and $m/n$ is from about 0.7 to 1.1 and the maximum value of $m$ is equal to $n+2$ which comprises heat treating a substantially water-insoluble ammonium polyphosphate at temperatures from about 100° C. to about 350° C. and under an atmosphere having an ammonia vapor pressure less than:

$$\log_{10} P_{NH_3} = 7.37 - \frac{2860}{T}$$

where $P_{NH_3}$ is the partial pressure of ammonia and T is the temperature of said heat treatment in degrees Kelvin, and a water vapor pressure greater than:

$$P_{H_2O} = 40/P_{NH_3}$$

where $P_{H_2O}$ is the partial pressure of water and $P_{NH_3}$ is the partial pressure of ammonia, for a sufficient time to convert said water-insoluble ammonium polyphosphate to said water-soluble ammonium polyphosphate.

3. The process of claim 2, wherein said heat treating is conducted at temperatures from about 200° C. to about 300° C.

4. A process for preparing crystalline ammonium polyphosphate having a solubility of 5 grams or less/100 cc. of water when 10 grams of said polyphosphate is slurried in 100 cc. of water at 25° C. for 10 minutes and having the general formula:

$$H_{(n-m)+2}(NH_4)_m P_n O_{3n+1}$$

wherein $n$ is an integer having an average value greater than 10 and $m/n$ is from about 0.7 to 1.1 and the maximum value of $m$ is equal to $n+2$ and having a solubility less than about 1.5 which comprises thermally condensing a composition comprised of condensed phosphoric acid and urea at temperatures from about 200° C. to about 300° C. and under an atmosphere having an ammonia vapor pressure of at least:

$$\log_{10} P_{NH_3} = 7.37 - \frac{2860}{T}$$

where $P_{NH_3}$ is the partial pressure of ammonia and T is the temperature of said thermal condensation in degrees Kelvin and a water vapor pressure less than about 2 mm. Hg for a sufficient time to convert said composition to said ammonium polyphosphate.

5. A process for preparing crystalline ammonium polyphosphate having the formula $$H_{(n-m)+2}(NH_4)_m P_n O_{3n+1}$$

wherein $n$ is an integer having an average value greater than 10 and $m/n$ is from about 0.7 to 1.1 and the maximum value of $m$ is equal to $n+2$ prepared by thermally condensing a composition comprised of an ammoniating agent, a condensing agent and a phosphate containing material under the conditions of (1) a temperature from about 100° C. to about 350° C., (2) an atmosphere defined by Equation A for ammonia vapor pressure and B for water vapor pressure wherein Equation A is $$\log_{10} P_{NH_3} = 7.37 - \frac{2860}{T}$$

where $P_{NH_3}$ is the partial pressure of ammonia and T is the temperature of said thermal condensation in degrees Kelvin, and Equation B is $$P_{H_2O} = 40/P_{NH_3}$$

where $P_{H_2O}$ is the partial pressure of water and $P_{NH_3}$ is the parial pressure of ammonia such that when a water insoluble ammonium polyphosphate of 5 grams or less/100 cc. of water is desired the ammonia vapor pressure is at least that defined in Equation A and the water vapor pressure is no greater than that defined in Equation B, the converse relationship between Equations A and B being had when a water soluble ammonium polyphosphate greater than 5 grams/100 cc. of water is desired, said water solubility being determined by slurrying 10 grams of said polyphosphate with 100 cc. of water at 25° C. for 10 minutes, and (3) for a sufficient time to convert said composition to ammonium polyphosphate whereby a crystalline ammonium polyphosphate of desired water solubility is obtained.

6. The process of claim 5, wherein the ammoniating agent and the condensing agent is a combined agent.

7. The process of claim 6, wherein said combined ammoniating and condensing agent is urea.

8. The process of claim 7, wherein said thermal condensation is conducted at temperatures from about 200° C. to about 300° C.

9. The process of claim 7, wherein said phosphate containing material is an ammonium orthophosphate.

10. The process of claim 7, wherein said phosphate containing material is orthophosphoric acid.

11. The process of claim 7, wherein said phosphate containing material is a condensed phosphoric acid.

References Cited

UNITED STATES PATENTS

| | | | |
|---|---|---|---|
| 3,241,946 | 3/1966 | Young | 71—43 |
| 3,333,921 | 8/1967 | Knollmueller | 23—106 |

OSCAR R. VERTIZ, Primary Examiner

HOKE S. MILLER, Assistant Examiner

PO-1050
(5/69)

UNITED STATES PATENT OFFICE
CERTIFICATE OF CORRECTION

Patent No. 3,495,937          Dated February 17, 1970

Inventor(s) CHUNG YU SHEN and NORMAN E. STAHLHEBER

It is certified that error appears in the above-identified patent and that said Letters Patent are hereby corrected as shown below:

Column 9, line 10, 274mm. should read 275mm. Column 10, line 14, 35°C should read 350°C. Column 11, line 20, in the formula, that portion reading $P_{NH_3}$-- should read $P_{NH_3}=$.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents